United States Patent [19]
Nishii et al.

[11] Patent Number: 5,960,630
[45] Date of Patent: *Oct. 5, 1999

[54] HYDRAULIC BRAKE APPARATUS FOR A VEHICLE

[75] Inventors: Michiharu Nishii, Toyota; Satoshi Ishida, Chiryu; Masahiko Kato, Toyoake, all of Japan

[73] Assignees: Aisin Seiki Kabushiki Kaisha, Kariya city, Aichi; Toyota Jidosha Kabushiki Kaisha, Toyota city, Aichi, both of Japan

[*] Notice: This patent is subject to a terminal disclaimer.

[21] Appl. No.: 08/864,346

[22] Filed: May 28, 1997

[30] Foreign Application Priority Data

May 31, 1996 [JP] Japan ..................... 8-160990

[51] Int. Cl.$^6$ ..................... B60T 11/20
[52] U.S. Cl. ............... 60/562; 60/585; 60/591; 60/592
[58] Field of Search ................. 60/597.1, 562, 60/533, 591, 592, 585

[56] References Cited

U.S. PATENT DOCUMENTS

| | | |
|---|---|---|
| 3,928,970 | 12/1975 | Farr . |
| 3,972,192 | 8/1976 | Muterel ..................... 60/562 |
| 4,874,207 | 10/1989 | Nishii et al. . |
| 4,892,361 | 1/1990 | Nishii et al. . |
| 5,070,698 | 12/1991 | Savidan ..................... 60/562 |
| 5,515,678 | 5/1996 | Kurokawa et al. ............ 60/592 X |

FOREIGN PATENT DOCUMENTS

| | | |
|---|---|---|
| 38 21 225 | 2/1989 | Germany . |
| 0129265 | 10/1979 | Japan ..................... 60/562 |
| 711129 | 6/1954 | United Kingdom . |
| 1 456 206 | 11/1976 | United Kingdom . |

*Primary Examiner*—Hoang Nguyen
*Attorney, Agent, or Firm*—Burns, Soane, Swecker & Mathis, LLP

[57] ABSTRACT

The invention is directed to a hydraulic brake apparatus which includes a master cylinder having a cylinder body and a master piston slidably disposed therein for defining a pressure chamber ahead of the master piston and a power chamber behind the master piston. A control piston is slidably disposed in the cylinder body ahead of the master piston to define the pressure chamber behind the control piston, and adapted to be moved in response to movement of the master piston. An auxiliary pressure source is provided for pressurizing brake fluid to generate a power pressure, and a valve assembly is communicated with the auxiliary pressure source to regulate the power pressure into a regulated pressure in response to movement of the control piston. The valve assembly is adapted to supply the regulated pressure into the power chamber to assist the operation of a brake pedal. The control piston is provided with at least one sealing member to separate the regulator chamber from the pressure chamber with substantially equal pressure applied to one end of the sealing member and the other end of the sealing member.

5 Claims, 1 Drawing Sheet

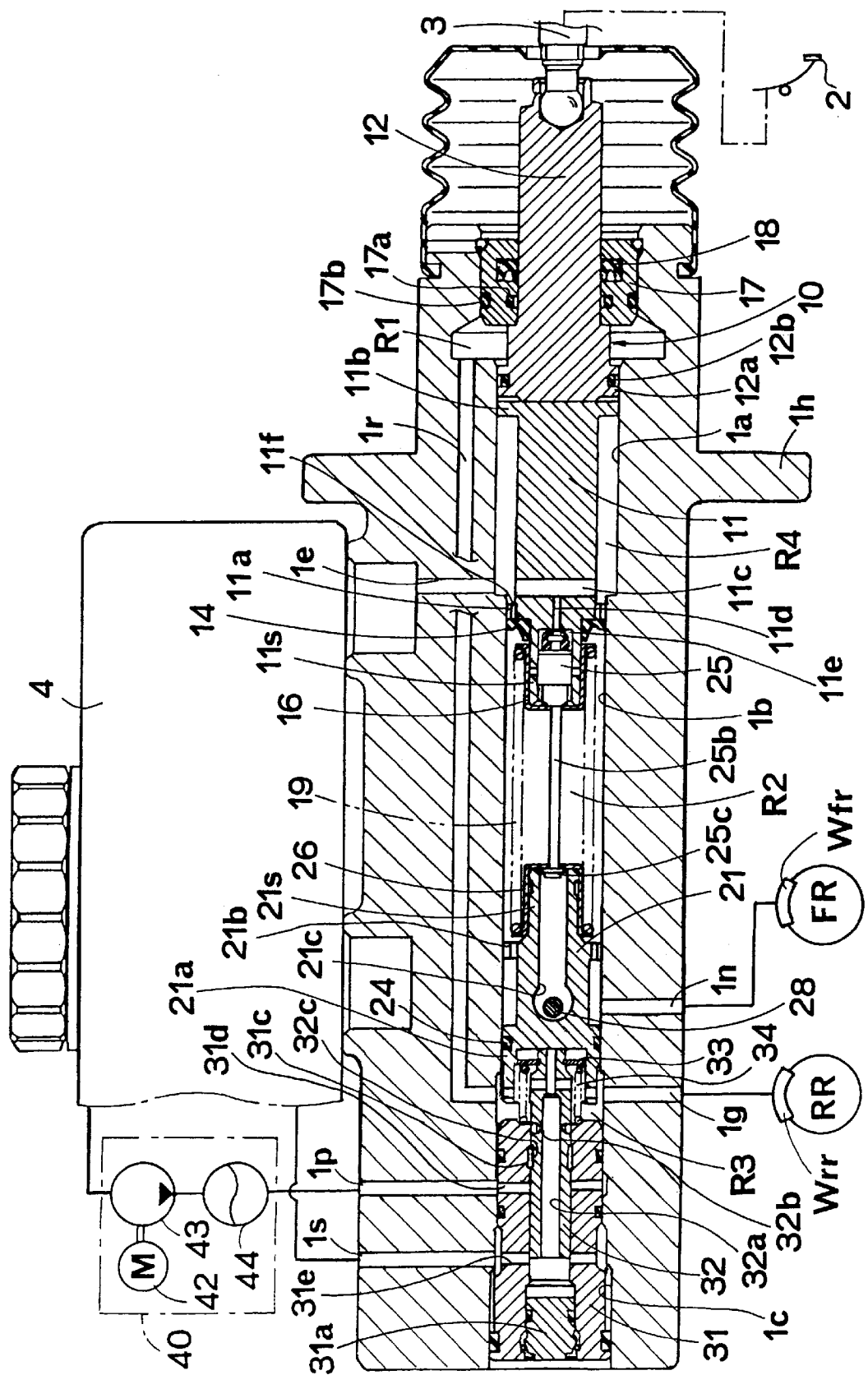

HYDRAULIC BRAKE APPARATUS FOR A VEHICLE

BACKGROUND OF THE INVENTION

1. Field of the Invention

The present invention relates to a hydraulic brake apparatus for a vehicle, and more particularly to the apparatus having an auxiliary pressure source for generating a power pressure and a valve assembly for regulating the power pressure into a regulated pressure.

2. Description of the Related Arts

As for the hydraulic brake apparatus having the auxiliary pressure source and the valve assembly, the U.S. Pat. No. 3,928,970 discloses power-assisted master cylinder assemblies which comprise a piston movable in a cylinder bore, a pressure space ahead of the piston having an outlet for connection to a brake circuit, a power chamber behind the piston having an inlet for connection to a source of fluid under pressure, and a control valve assembly for controlling the supply of fluid from the pressure source to the power chamber. It is an object of the invention disclosed in the above United States Patent to provide a power-assisted master cylinder assembly in which the piston is pedal operated but which does not require a movable inlet or inlet seals which move under pressure. According to the assembly as disclosed above, the power-assisted master cylinder includes a pedal operated first piston for pressurizing the pressure space connected to the brake circuit, and a second piston for operating valve means controlling the fluid assisting the pedal, movement of the first piston being transmitted to the second piston either hydraulically or mechanically. In that assembly, one end of the second piston is exposed to the pressure in the pressure space and the other end is exposed to the pressure of the assisting fluid.

According to the assembly as disclosed in the above United States Patent, when the brake pressure in the wheel cylinder is to be controlled in response to depression of the brake pedal, the control valve assembly (or valve assembly) has to be operated rapidly in response to a small variation of depressing force applied to the brake pedal, in fact a variation of master cylinder pressure caused by the variation of depressing force. In the assembly as disclosed in the above United States Patent, however, the control piston is provided with two seals, each seal having one end exposed to the pressure in the pressure space or the pressure of the assisting fluid, and the other end exposed to the pressure in the space leading to the reservoir under the atmospheric pressure. Therefore, a large pressure difference is applied to the seals, thereby to deform the seals. As a result, the frictional force of the seals will be increased to cause an excessive hysteresis in an input-output characteristic of the brake pressure, for example, so that it will be difficult to achieve a desired power-assisted operation.

SUMMARY OF THE INVENTION

Accordingly, it is an object of the present invention to provide a hydraulic brake apparatus for a vehicle, which includes a master cylinder having a master piston, an auxiliary pressure source for generating a power pressure and a valve assembly for regulating the power pressure into a regulated pressure in response to movement of a control piston and supplying the regulated pressure to a power chamber defined behind the master piston to assist operation of a manually operated member, and which is adapted to ensure a smooth movement of the control piston, and properly assist the operation of the manually operated member.

In accomplishing the above and other objects, a hydraulic brake apparatus for a vehicle includes a master cylinder having a cylinder body and a master piston slidably disposed therein for defining a pressure chamber ahead of the master piston and a power chamber behind the master piston. The master piston is adapted to be moved forward in response to operation of a manually operated member, e.g., a brake pedal to generate a brake pressure from the pressure chamber. A control piston is slidably disposed in the cylinder body ahead of the master piston to define the pressure chamber behind the control piston. The control piston is adapted to be moved in response to movement of the master piston. An auxiliary pressure source is provided for pressurizing brake fluid to generate a power pressure. And, a valve assembly having a regulator chamber defined ahead of the control piston and communicated with the auxiliary pressure source is provided for introducing the power pressure into the regulator chamber to regulate the power pressure into a regulated pressure in response to movement of the control piston. The valve assembly is adapted to supply the regulated pressure into the power chamber to assist the operation of the manually operated member. The control piston is provided with at least one sealing member to separate the regulator chamber from the pressure chamber with substantially equal pressure applied to one end of the sealing member and the other end of the sealing member.

In the above-described apparatus, the valve assembly preferably includes a spool which is engaged with a front end of the control piston within the regulator chamber, and a sleeve disposed in the cylinder body and having a bore for slidably receiving therein the spool. The spool is adapted to be moved relative to the sleeve in response to movement of the control piston to introduce the power pressure from the auxiliary pressure source into the regulator chamber and generate the regulated pressure therefrom.

BRIEF DESCRIPTION OF THE DRAWING

The above stated object and following description will become readily apparent with reference to the accompanying drawing, which is a sectional view of a hydraulic brake apparatus for a vehicle according to an embodiment of the present invention.

DESCRIPTION OF THE PREFERRED EMBODIMENT

Referring to the drawing, there is illustrated a hydraulic brake apparatus for a vehicle, which includes a cylinder body 1h provided with a master cylinder section and a regulator section, and which includes a brake pedal 2 which is disposed behind the cylinder body 1h (the right in the drawing) as a manually operated member according to the present invention. A depressing force applied on the brake pedal 2 is transmitted as a braking force to the master cylinder section and the regulator section through a push rod 3. In response to the depressing force, a hydraulic pressure is generated in the master cylinder section and the regulator section, and applied to wheel cylinders Wfr, Wfl, Wrr, Wrl which are operatively mounted on front wheels FR, FL and rear wheels RR, RL of the vehicle. In the drawing, there are disclosed only the wheels FR, RR which are located at the front right and rear right of the vehicle, and the wheel cylinders Wfr, Wrr which are operatively mounted on the wheels FR, RR.

In the cylinder body 1h, there is formed a stepped bore which includes bores 1a, 1b, 1c having different diameters from one another, and in which a master piston 10 and a control piston 21 are received to define therebetween a pressure chamber R2. The bore 1a is communicated with a power chamber R1 having a larger diameter than that of the bore 1a. The control piston 21 is fluid-tightly and slidably received in the bore 1b having the smallest diameter. The master piston 10 has a first piston 11 and a second piston 12.

The opposite ends of the first piston 11 are received in the bore 1b and the bore 1a which is larger in diameter than the bore 1b, respectively. More specifically, the first piston 11 has a land portion 11a of a relatively small diameter formed around its outer periphery at its front end portion, and a land portion 11b of a relatively large diameter formed at its rear end portion which is away from the land portion 11a by a certain distance. The land portion 11a is provided with an annular cup-like sealing member 14 to be fluid-tightly and slidably received in the bore 1b, while the land portion 11b is slidably received in the bore 1a in abutment with the second piston 12.

The first piston 11 has a cylindrical support portion 11s integral therewith and a recess lie formed axially therein. Furthermore, the first piston 11 has a radial passage 11c, and an axial passage 11d communicated therewith and opened to the recess lie in which a valve member 25 is slidably received. A retainer 16 is mounted on the support portion 11s to restrain the valve member 25 from moving toward the control piston 21. One end of the valve member 25 is covered by a resilient material such as rubber which can abut on the passage 11d to close the same. At the other end of the valve member 25, a rod 25b is formed to be integral with the valve member 25, and an engaging portion 25c is formed at the front end of the rod 25b. At the front land portion 11a of the first piston 11, an axial passage 11f is formed. The annular sealing member 14 is disposed at an end of the passage 11f opening to the pressure chamber R2, so that a one-way valve is formed. Accordingly, a fluid chamber R4 which is communicated with a reservoir 4 through a port 1e can be communicated with the pressure chamber R2 through the passages 11c, 11d and 11f.

Behind the first piston 11 is disposed the second piston 12 having a land portion 12a formed around its outer periphery at its front end portion and provided with an annular sealing member 12b which is fluid-tightly and slidably received in the bore 1a, with its front end face arranged to abut on the rear end face of the first piston 11. Therefore, the power chamber R1 is separated from the fluid chamber R4 in the bore 1a by the sealing member 12b. A main body of the second piston 12 is supported by a cylindrical sleeve 17. On the inner periphery and outer periphery of the sleeve 17, circumferential grooves are formed to receive therein sealing members 17a, 17b, and on the inner periphery of the sleeve 17 axially remote from the sealing members 17a, 17b, a circumferential groove is formed to receive therein a sealing member 18 thereby to seal the power chamber R1 effectively. The first piston 11 and the second piston 12 may be made as one body.

At the front portion of the cylinder body 1h, there is formed the regulator section which is connected to an auxiliary pressure source 40 for supplying a power pressure therefrom. The auxiliary pressure source 40 includes an electric motor 42 and a fluid pump 43 driven by the motor 42, and its inlet is connected to a reservoir 4 and its outlet is connected to an accumulator 44 through which the power pressure is supplied to a passage 31d via a port 1p. The control piston 21 has a pair of land portions 21a, 21b formed around its outer periphery with a certain distance apart axially therebetween, and received in the bore 1b. An annular sealing member 24 is disposed only in the front land portion 21a, so that the pressure chamber R2 is sealed from a regulator chamber R3 which will be described later. Accordingly, the pressure chamber R2 is formed between the sealing member 24 and the sealing member 14 disposed on the land portion 11a of the first piston 11.

As shown in the drawing, the control piston 21 has a passage 21c which is formed radially and extends axially to be opened at the rear end. The passage 21c receives therein an engaging pin 28 which is fixed to the cylinder body 1h, so that the control piston 21 is allowed to move forward, but restrained from moving backward (i.e., restrained from moving toward the first piston 11). The control piston 21 has a cylindrical support portion 21s, integral therewith to enclose the passage 21c, and the engaging portion 25c of the valve member 25 is disposed in the support portion 21s. A retainer 26 is mounted on the support portion 21s, and engaged with the engaging portion 25c to restrain the valve member 25 from moving toward the master piston 10. At the axial end of the control piston 21 opposite to the retainer 26, is formed a recess in which an end portion of a spool 32 is held as described later.

A cylindrical sleeve 31 is received in the stepped bore 1c which is communicated with the bore 1b. The sleeve 31 has a plurality of circumferential grooves formed around its periphery, and annular sealing members are received in the grooves, respectively. Between the neighboring sealing members are formed radial passages 31d, 31e to communicate the ports 1p, 1s with the hollow portion of the sleeve 31, in which the spool 32 is slidably received, and the front end of which is closed by a plug 31a.

In the spool 32, are formed an axial passage 32a and a radial throttle passage 32b communicated with the passage 32a. One end of the spool 32 is placed in the regulator chamber R3 and engaged with the control piston 21. A retainer 33 is supported in the recess of the control piston 21, and a spring 34 is mounted between the sleeve 31 and the retainer 33 to urge the spool 32 to abut on the control piston 21. The axial passage 32a is so arranged that its open end normally opens in the regulator chamber R3 at the junction of the spool 32 and the control piston 21. When the control piston 21 is placed in its initial position, the other end of the passage 32a of the spool 32 is arranged to be communicated with the reservoir 4 through the passage 31e and the port 1s, so that the regulator chamber R3 is communicated with the reservoir 4 to be filled with the brake fluid under the atmospheric pressure.

The passage 31d is formed in the sleeve 31 so as to be communicated with the auxiliary pressure source 40 through the port 1p, while it has been closed by the spool 32 as shown in the drawing. A circumferential groove 31c is formed on the inner periphery of the sleeve 31 with a certain distance away from the passage 31d, and a circumferential groove 32c is formed on the outer periphery of the spool 32 to face the groove 31c. Accordingly, when the spool 32 is placed at its position as shown in the drawing, the regulator chamber R3 is communicated with the reservoir 4 through the passage 32a of the spool 32, the passage 31e of the sleeve 31 and the port is to be under the atmospheric pressure. When the spool 32 is moved toward the plug 31a in response to movement of the control piston 21, the groove 31e of the sleeve 31 is shut off, and in turn the passage 31d of the sleeve 31 faces the groove 32c of the spool 32 and at the same time the groove 31c faces the throttle passage 32b, so that the regulator chamber R3 is communicated with the passage 32a. Consequently, the power pressure is supplied from the auxiliary pressure source 40 into the regulator chamber R3 to increase the pressure therein. The regulator chamber R3 is communicated with the pressure chamber R1 through a port 1r formed in the cylinder body 1h.

In operation, when the brake pedal 2 is depressed to push the second piston 12 forward (to the left in the drawing) through the push rod 3 from its free position as shown in the drawing, the valve member 25 abuts on the first piston 11 to shut off the passage lid by the resilient member of the valve member 25, so that the communication between the pressure chamber R2 and the fluid chamber R4 is blocked to be in a closed state. Thus, when the first piston 11 is moved in response to depression of the brake pedal 2 with the communication between the pressure chamber R2 and the fluid chamber R4 blocked, the pressure chamber R2 is compressed. In this case, since the master piston 10 and the control piston 21 are held to be in the condition as shown in the drawing through a spring 19, they move together as one body. Then, the spool 32 engaged with the control piston 21 will shut off the passage 31e to block the communication between the reservoir 4 and the regulator chamber R3. At the same time, the power pressure is supplied from the auxiliary pressure source 40 into the regulator chamber R3 through the port 1p, passage 31d, grooves 31c, 32c, and throttle passage 32b, thereby to be fed into the wheel cylinder Wrr through a port 1g as a regulated pressure, and also fed into the power chamber R1 through the port 1r. Whereby, the first and second pistons 11, 12 are moved forward, so that the pressure chamber R2 is compressed to generate the master cylinder pressure from a port 1n. In this case, the movement of the first piston 11 is assisted by the regulated pressure supplied in response to depression of the brake pedal 2, because the sealing diameter of the land portion 12a of the second piston 12 is larger than the sealing diameter of the land portion 11a of the first piston 11.

During this operation, if the regulated pressure becomes greater than the master cylinder pressure, the control piston 21 is actuated to move away from the sleeve 31, so that the passage 32a of the spool 32 is communicated with the reservoir 4, thereby to decrease the pressure in the regulator chamber R3. Whereas, if the regulated pressure becomes smaller than the master cylinder pressure, the passage 31e is shut off, and in turn the power pressure is introduced from the auxiliary pressure source 40 through the passage 31d into the regulator chamber R3 to increase the pressure therein. Thus, the pressure in the regulator chamber R3 is regulated by repetition of the movement of the control piston 21 as described above and the movement of the spool 32 activated in accordance with the movement of the control piston 21 into substantially the same pressure as the master cylinder pressure. In other words, the pressure applied to the opposite ends of the sealing member 24 mounted on the control piston 21 will be substantially equal. As a result, the frictional force caused by the movement of the sealing member 24 is made so small that the control piston 21 will slide in the bore lb smoothly. Whereby, the assisting operation or boost operation will be made appropriately, and a proper braking property will be obtained.

It should be apparent to one skilled in the art that the above-described embodiment is merely illustrative of but one of the many possible specific embodiment of the present invention. Numerous and various other arrangements can be readily devised by those skilled in the art without departing from the spirit and scope of the invention as defined in the following claims.

What is claimed is:

1. A hydraulic brake apparatus for a vehicle comprising:
    a master cylinder having a cylinder body and a master piston slidably disposed therein for defining a pressure chamber ahead of said master piston and a power chamber behind said master piston, said master piston being moved forward in response to operation of a manually operated member to generate a brake pressure from said pressure chamber;
    a control piston slidably disposed in said cylinder body ahead of said master piston for defining said pressure chamber behind said control piston, said control piston being moved in response to movement of said master piston;
    an auxiliary pressure source for pressurizing brake fluid to generate a power pressure; and
    valve means having a regulator chamber defined ahead of said control piston and communicated with said auxiliary pressure source for introducing the power pressure into said regulator chamber to regulate the power pressure into a regulated pressure in response to movement of said control piston, said valve means supplying the regulated pressure into said power chamber to assist the operation of said manually operated member, and
    said control piston being provided with at least one sealing member for separating said regulator chamber from said pressure chamber with substantially equal pressure applied to one end of said sealing member and the other end of said sealing member.

2. A hydraulic brake apparatus for a vehicle as recited in claim 1, wherein said valve means comprises:
    a spool engaged with a front end of said control piston within said regulator chamber; and
    a sleeve disposed in said cylinder body and having a bore for slidably receiving therein said spool, said spool being moved relative to said sleeve in response to movement of said control piston to introduce the power pressure from said auxiliary pressure source into said regulator chamber and generate the regulated pressure therefrom.

3. A hydraulic brake apparatus for a vehicle as recited in claim 1, wherein said cylinder body has a bore equal in diameter along a path of said control piston and said master piston moving in said bore, one end of said sealing member being exposed to said regulator chamber, and the other end of said sealing member being exposed to said pressure chamber, and wherein said valve means is adapted to generate the regulated pressure substantially equal to the brake pressure generated from said pressure chamber.

4. A hydraulic brake apparatus for a vehicle as recited in claim 3, wherein said control piston is provided with a single circumferential groove for receiving therein said sealing member.

5. A hydraulic brake apparatus for a vehicle as recited in claim 3, wherein said valve means comprises:
    a spool engaged with a front end of said control piston within said regulator chamber; and
    a sleeve disposed in said cylinder body and having a bore for slidably receiving therein said spool, said spool being moved relative to said sleeve in response to movement of said control piston to introduce the power pressure from said auxiliary pressure source into said regulator chamber and generate the regulated pressure therefrom.

* * * * *